Dec. 16, 1958　　　　　B. LONG　　　　　2,864,203
APPARATUS FOR COOLING OF GLASS
Filed Oct. 13, 1953
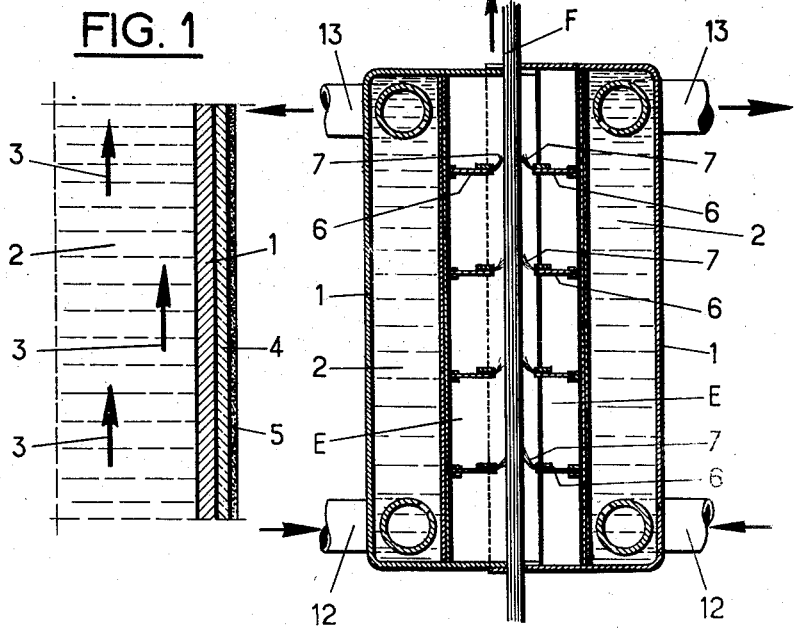
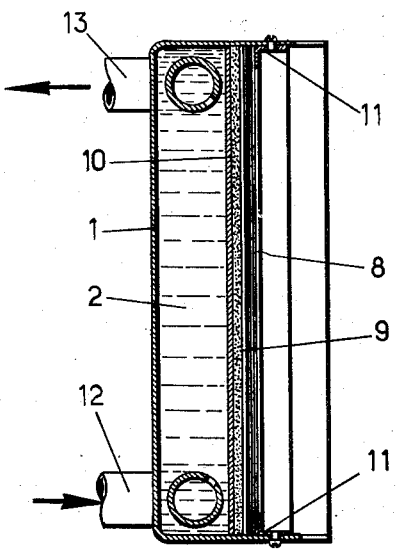
INVENTOR
BERNARD LONG
BY
Emery Holcombe & Blau
ATTORNEYS United States Patent Office 2,864,203
Patented Dec. 16, 1958

2,864,203

APPARATUS FOR COOLING OF GLASS

Bernard Long, Paris, France, assignor to Compagnies Reunies des Glaces & Verres Speciaux du Nord de la France, Paris, France, a corporation of France Application October 13, 1953, Serial No. 385,841

Claims priority, application France October 16, 1952

5 Claims. (Cl. 49—45)

The present invention relates to an apparatus for the rapid cooling of glass in the range in which its viscosity is less than $10^{15}$ poises, and more especially in the range in which its viscosity is between $10^{12}$ and $10^{14}$ poises, which range corresponds to a temperature zone including the critical annealing temperature zone.

The main object of the invention is to ensure a slight temperature gradient throughout the thickness, even when the glass is cooled rapidly over the whole of its thickness.

It is known that when a thick mass of glass at a high temperature radiates on to an external absorbing body, which is cooler than the glass the resultant cooling affects not only the surface but also the subjacent layers, the depth affected measured from the surface, being greater when the glass is less absorbent for the radiation which it emits at the temperature in question.

On the other hand, in my U. S. specification No. 345,087 entitled "Method of and Apparatus for the Rapid Annealing of Glass Sheets in a Continuous Process," filed on the 17th March 1953, now Patent No. 2,725,679, issued December 6, 1955, I showed that if the effect of convection by the surrounding air is rendered negligible it is possible to cool a sheet of clear glass rapidly by causing it to pass through an enclosed space having walls which are cooled and which are totally absorbing, while producing only a slight temperature gradient between the central zone and the surface, whereby it is possible to employ a method of a rapid annealing of sheets of clear glass based on this manner of cooling.

The present invention concerns a means for rapidly cooling glass employing only heat exchange by radiation and making it possible to create in the temperature range mentioned above a temperature gradient, throughout the thickness, which is substantially smaller than that obtained when the glass is cooled by causing it to radiate on to the walls of a totally absorbing black chamber surrounding the glass.

The means according to the invention consists of a chamber the cooled walls of which are selectively absorbent and return to the glass a radiation of which the intensity is less than that of the radiation received, and of which the composition is different from that of the radiation received.

It must be stressed that since the cooling is rapid, the absorption of the walls of the chamber is necessarily large and that the quantity of energy reflected by them is relatively small. On the other hand, it must be clearly understood that the heat losses of the glass by convection are rendered practically negligible, the most simple way of effecting this being, as is known, to practically immobilise the air in contact with the surface of the glass, for instance by dividing the column of air between the glass and the walls of the chamber by means of non-absorbent partitions which are heat insulated from said walls and are not in contact with the glass.

In accordance with the invention, the walls of the chamber are highly absorptive in the radiation range in which the glass radiates the maximum of energy, and they are highly reflective in the range in which the glass radiates to a moderate or slight extent. Thus the two major conditions necessary for carrying the invention into effect are realised, viz.:

(a) Rapid cooling by means of the walls of the chamber only;

(b) A smaller temperature gradient, throughout the thickness, than in the case of a chamber having totally absorbing black walls, since the reflected energy is for the most part absorbed in the surface layer of the glass and raises the temperature of this layer and therefore tends to reduce the temperature difference between this layer and the central layer.

To clarify matters, it can be stated that in the case of the annealing of clear glass the walls of the chamber are made highly absorbent in the range of radiations having a wave-length greater than 3 microns and that they are made only moderately or slightly absorbent in the range of radiations having a wave length less than 3 microns.

The invention concerns an apparatus for carrying the above mentioned method into effect, having the following characteristics:

The walls of the chamber are generally made in two parts:

(a) A mechanically strong case which is cooled on one surface and of which the other surface, turned towards the glass, has a high reflective power for infrared radiations;

(b) A layer of small thickness applied to the reflecting surface of the case and having the selective absorption mentioned above.

The case is preferably made of metal. It may consist for instance of polished aluminum, of brass covered with a reflecting silver deposit, or of iron with a reflecting coating of chromium.

The absorbent layer is preferably a coating, a paint or a varnish containing an absorbent pigment.

It is advantageous to use finely ground clear or coloured glass as the absorbent pigment.

In one advantageous form of the apparatus according to the invention the reflecting case and the absorbent layer may be intimately bound together: for instance, aluminum plate may be covered with a colourless or coloured film by anodic oxidation: alternatively, a thin sheet of clear or coloured glass may have its rear surface covered with a reflecting metal deposit (silver-plating, aluminum plating, gilding or the like). In the latter case, since the strength of the glass is only slight it is advisable to apply the reflecting layer of glass to the metal plate forming one of the walls of the chamber having a cooled double wall, and to produce a good calorific contact between the glass and the wall by means of an intermediate material which is a good conductor of heat.

For determining the absorption power, it obviously must be borne in mind that the heat passes through the absorbent layer twice, that is to say before and after reflection from the reflecting case.

The absorbent power which the absorbent layer must have depends directly on the composition of the heat radiation of the glass and on the absorbent power of the glass itself.

It is advisable to remember that the intensity of absorption is controlled by the speed of cooling which has to be produced, but if the latter is fixed the temperature gradient depends to a large extent on the selectivity of absorption.

The cooling means according to the invention is mainly for use in the industrial annealing of glass.

It is known that from a practical point of view this annealing depends on maintaining a low temperature gradient throughout the thickness of the glass while passing through the temperature zone including the elbow of the expansion curve, which zone is generally referred to as the "critical zone."

The means according to the invention is therefore applied in the following manner:

When the temperature gradient in the critical zone has been fixed as a function of the maximum value of the permissible permanent internal stresses, the absorbent power of the absorbent layer is determined in accordance with the radiation and absorption characteristics of the glass in such a manner that the speed of cooling, which is always great, will be as high as possible in order to reduce the annealing time and therefore the size of the installations for carrying it into effect.

The means according to the invention can be independent of the actual form given to the glass, which may for instance be in the form of hollow bodies such as bottles, flasks, jars or the like or in the form of sheets for glaziery of any kind (windows, mirrors and the like). It is particularly suitable for sheets produced in a continuous manner by drawing or rolling, since the apparatus is in that case extremely simple.

This apparatus is in that case based directly on the apparatus described in my earlier specification mentioned above.

I shall now describe purely by way of example and without any limiting effect on the scope of the invention, apparatus for carrying into effect the method described above. This apparatus is illustrated purely diagrammatically in the accompanying drawings, in which:

Figure 1 shows one part of a chamber E having cooled walls, in which rapid cooling of glass is effected in accordance with the invention.

Figure 2 shows in vertical section a chamber E having cooled walls which are both absorbent and reflecting, for effecting the cooling of a continuous sheet of glass while passing through the critical annealing zone, and Figure 3 shows in vertical section one of the two boxes for cooling a continuous sheet in the case in which the cooled wall, which is both absorbent and reflecting, consists of a sheet of glass covered on its rear surface with a reflecting metal layer.

In the embodiment illustrated in Figure 1, the double wall 1 of the chamber 2, through which a current of water passes in the direction indicated by the arrows 3, is made of sheet iron.

On the wall facing the glass is applied a sheet of polished metal 4 of high reflecting power, which is covered by a selectively absorbent coating 5.

The sheet 4 preferably consists of anodically oxidized polished aluminum, which has the advantage of retaining a high reflecting power.

The coating 5 consists of a colorless varnish in which is incorporated a pigment which is selectively absorbent in the range of the infra-red spectrum, said pigment preferably consisting of powdered glass.

This powder is produced by grinding fragments of glass which is either clear or colored to a greater or less extent by means of coloring oxides which imparts to the glass the property of absorbing infra-red radiations, for instance oxides of iron, cobalt, nickel or copper.

Instead of being subsequently provided with a coating of absorbent varnish prepared separately, the polished aluminum may during anodic oxidation be covered with a lacquer, based on organic coloring materials, which absorbs infra-red radiations;

In Figure 2 the sheet of glass moved vertically upwards passes, after continuous drawing by any suitable process, through a cooling device which is similar to that described in my above mentioned earlier specification and which consists of two half-boxes in which water circulates and which are made of sheet iron 1 and are provided, on the side adjacent the glass sheet, with a sheet of polished metal 4 having a high reflecting power and covered with a selectively absorbent coating 5 as described above.

These two half-boxes are provided with thin partitions 6 carrying brushes 7 made of flexible bristles, in such a manner as to divide the volume E between the two boxes and to render convection by air in this volume negligible.

In Figure 3 the case, which is both reflecting and absorbent and is adapted to receive the radiation from the glass and after having filtered it to return a part thereof, consists of a sheet of glass 8 which is either clear or coloured by means of oxides absorbing infra-red radiations as mentioned previously.

This sheet 8 bears a reflecting covering 9 on the side adjacent the water chamber, for instance a layer of silver, and between this reflecting covering, protected by a layer of paint, and the wall 1 of the water chamber there is introduced a backing 10 of a material ensuring a good calorific contact, for instance aluminum powder. The sheet of glass 8 is held firmly against this backing by means of an angle-iorn frame 11.

The circulation of water inside the chamber 2 is ensured in a known manner by means of water inlet and outlet pipes 12 and 13 respectively.

It is obvious that the details of construction described and very diagrammatically illustrated in the drawings are given only by way of example and that they could be modified in various ways, and that certain elements could be replaced by equivalent elements, without thereby changing the nature of the invention.

What I claim is:

1. Apparatus for the industrial annealing of clear glass comprising a chamber for receiving said glass the inside walls of which have a high reflective power for infra-red radiation and are completely covered by a thin layer of a heat radiation absorbing material consisting of finely ground glass which has a higher absorptive power for radiations having wavelengths of more than three microns than for radiations having shorter wavelengths.

2. Apparatus for the industrial annealing of clear glass comprising a chamber for receiving said glass, in which the inside walls of said chamber have a surface of polished aluminum adapted to reflect radiations the wavelengths of which are under three microns, covered by a layer of oxide film which is more absorbent of radiations having wavelengths of three microns and over than of radiations having shorter wavelengths.

3. Apparatus for the industrial annealing of clear glass comprising a cooling chamber for receiving said glass, in which the inside walls of said chamber have inner surfaces of reflecting metal adapted to reflect radiations the wavelengths of which are under three microns covered with thin sheets of glass which are more absorbent of radiations having wavelengths of three microns and over than of radiations having shorter wavelengths.

4. Apparatus as claimed in claim 3 in which said thin sheets of glass are held firmly against the inner metal walls of said chamber and a material which is a good conductor of heat is interposed between said glass and metal to produce a good calorific contact.

5. Apparatus as claimed in claim 4 in which said conductor material is aluminum powder.

References Cited in the file of this patent

UNITED STATES PATENTS 1,830,788    Forman    Nov. 10, 1931

(Other references on following page)

UNITED STATES PATENTS

| | | |
|---|---|---|
| 1,865,811 | Amsler | July 5, 1932 |
| 1,895,548 | Lebel | Jan. 31, 1933 |
| 1,951,950 | Rising | Mar. 20, 1934 |
| 1,981,560 | Littleton | Nov. 20, 1934 |
| 2,122,941 | Hufler et al. | July 5, 1938 |
| 2,365,967 | Long | Dec. 26, 1944 |
| 2,438,160 | Green | Mar. 23, 1948 |
| 2,482,698 | Tillyer | Sept. 20, 1949 |
| 2,553,945 | Schrader | May 22, 1951 |
| 2,690,078 | Phillips | Sept. 28, 1954 |

OTHER REFERENCES

"Infrared Production and Transmission Reflection and Measurement" by Dr. Lewis R. Koller, "General Electric Review," vol. 44, No. 3, March 1941, pages 167–173, inclusive.